Jan. 30, 1923.
L. K. DAVIS.
ENDLESS TRACK VEHICLE.
FILED MAY 10, 1922.
1,443,871
6 SHEETS-SHEET 2
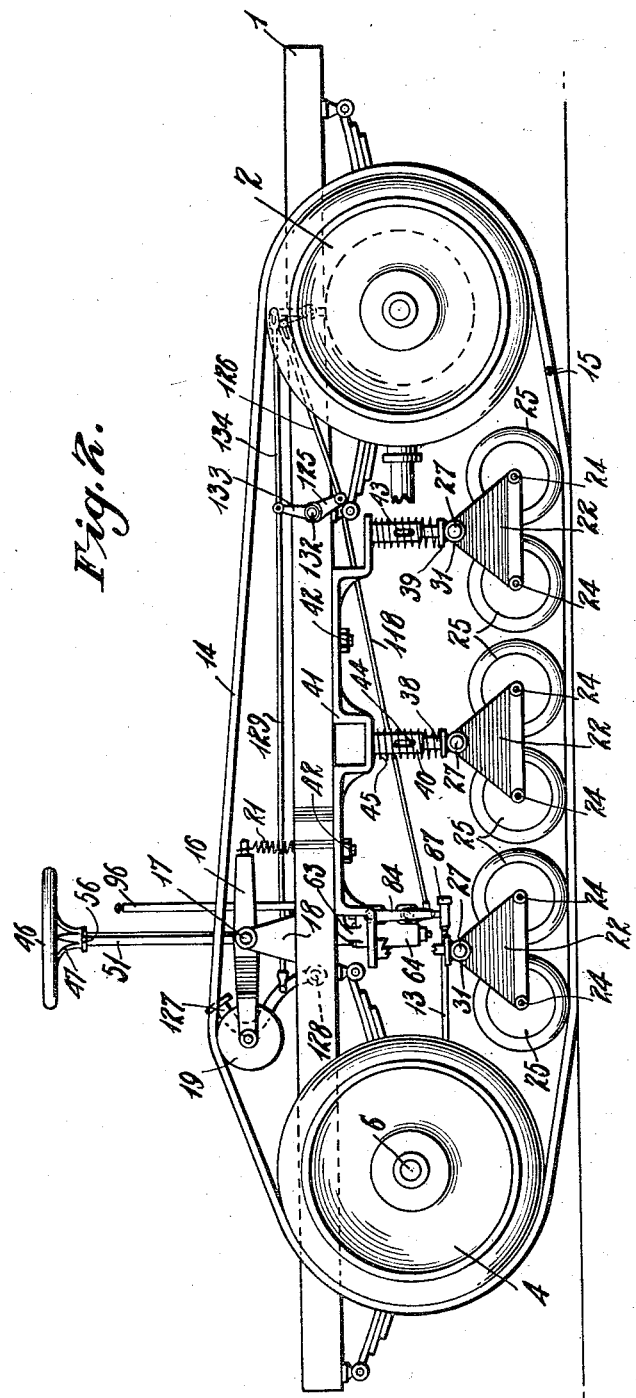
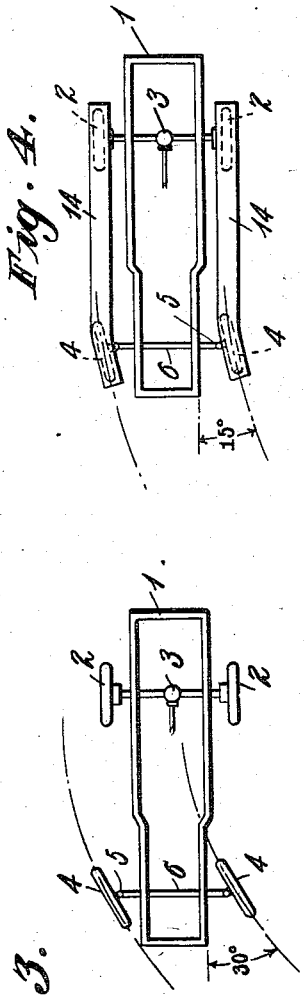
Inventor
Lewis K. Davis
By Semmes & Semmes
Attorneys

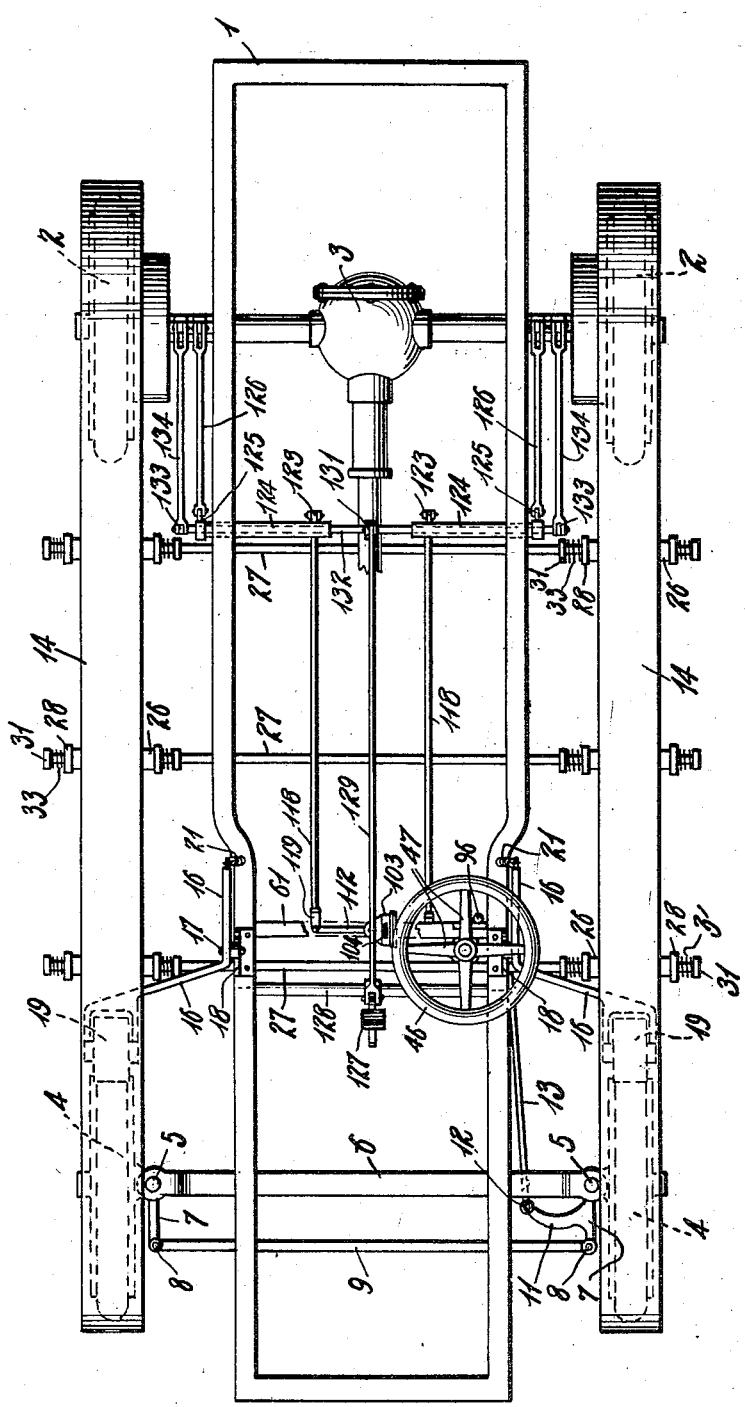

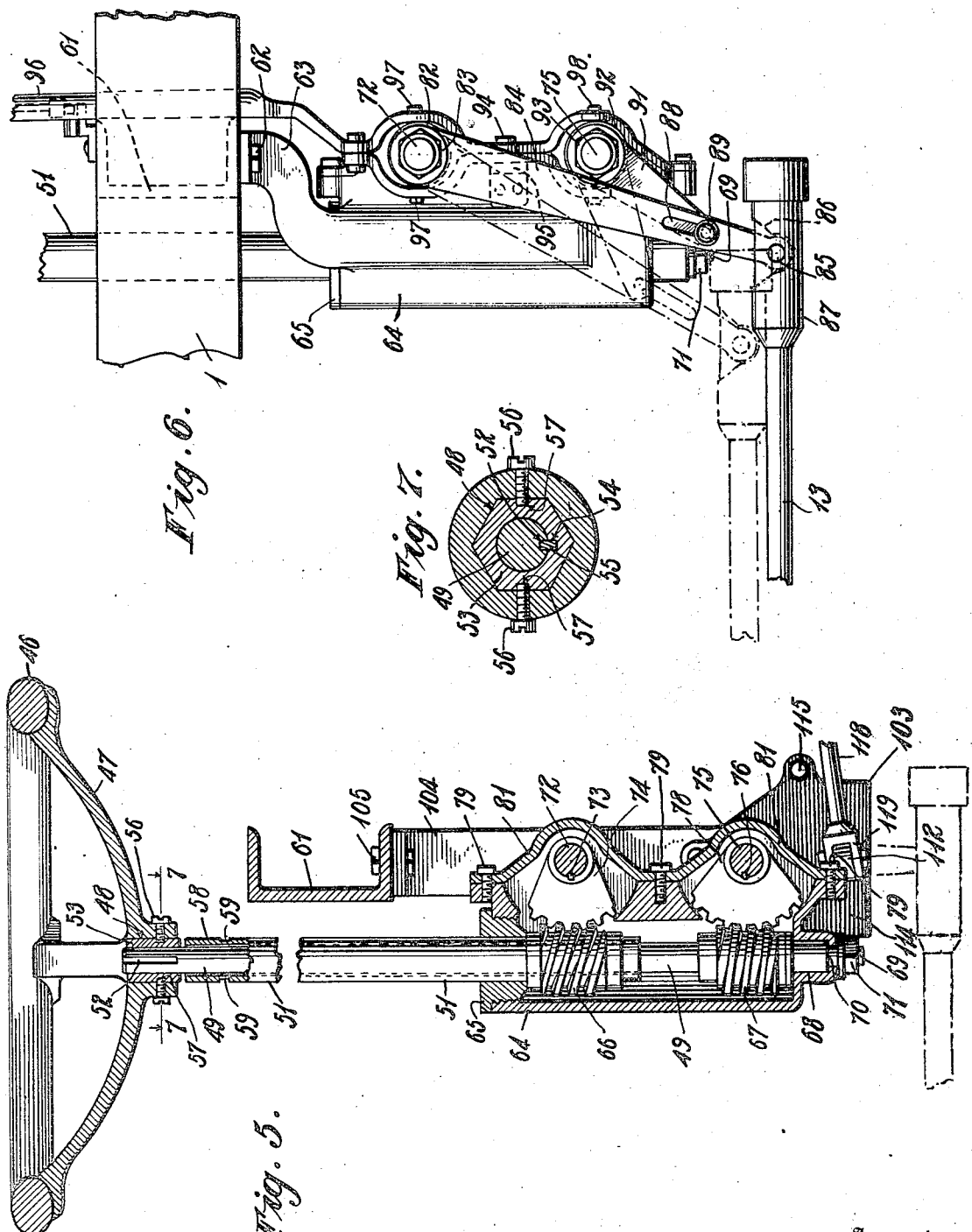

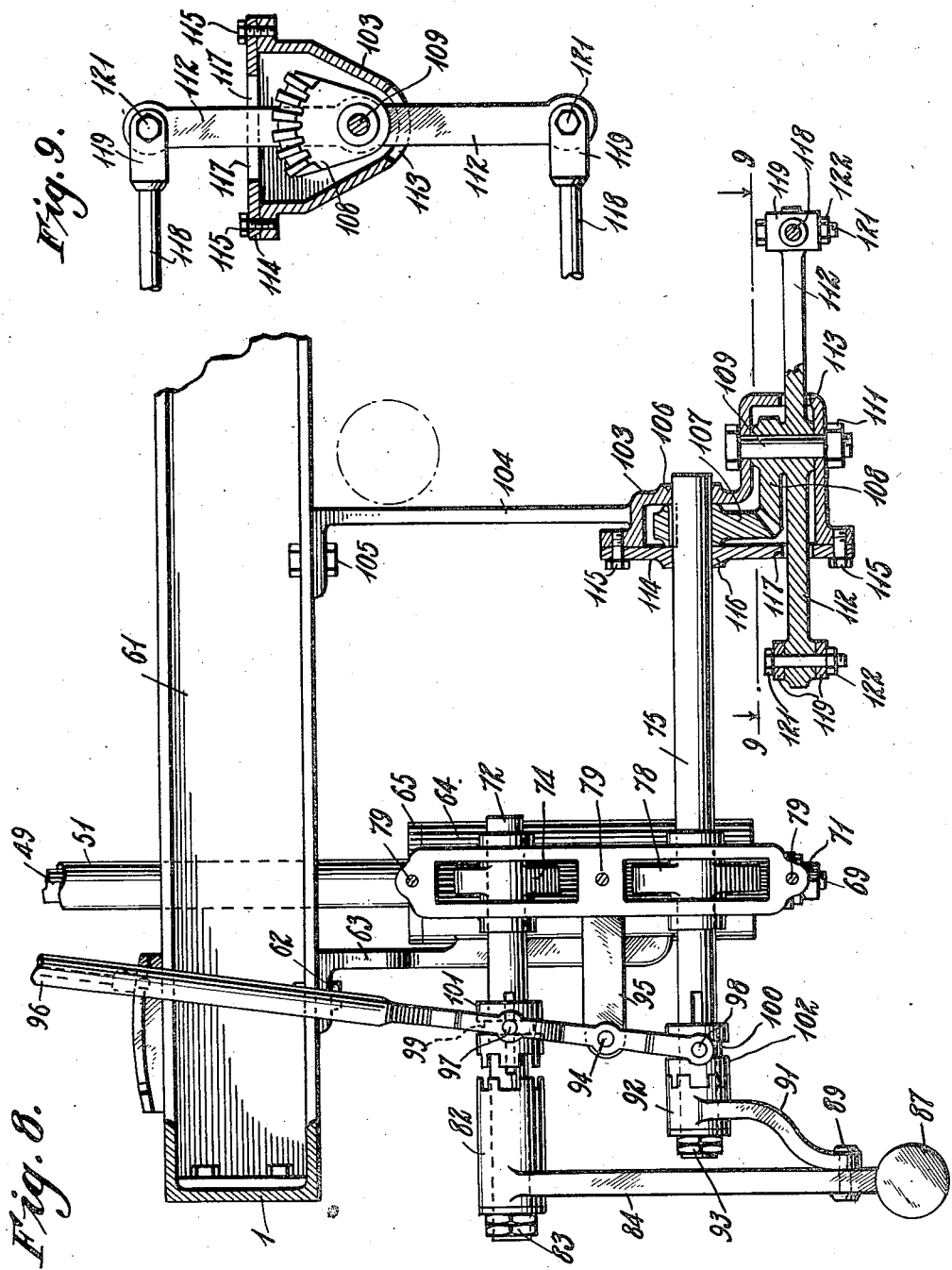

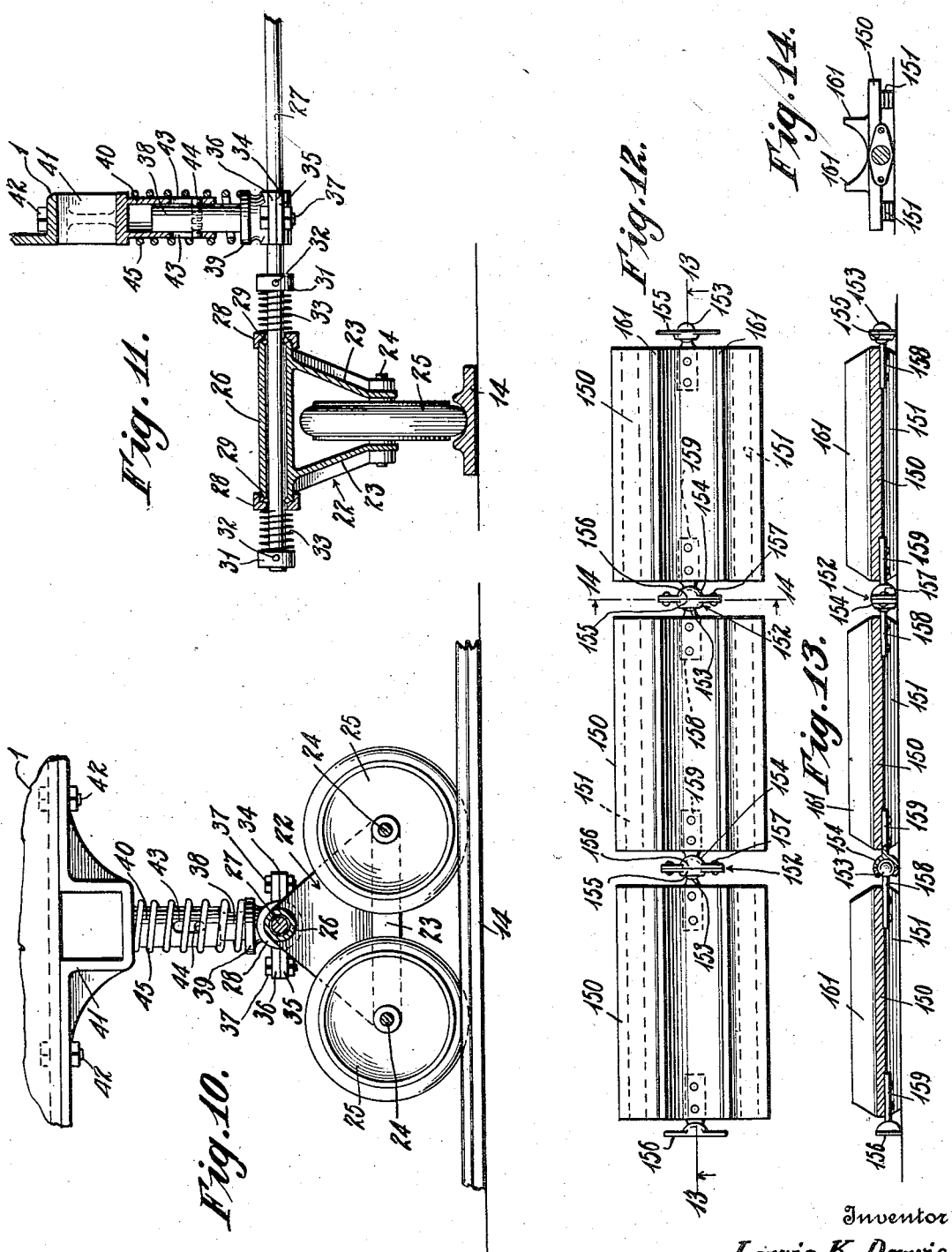

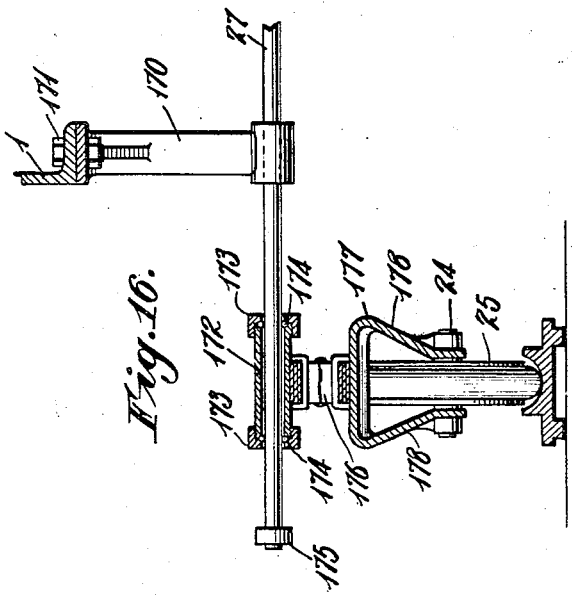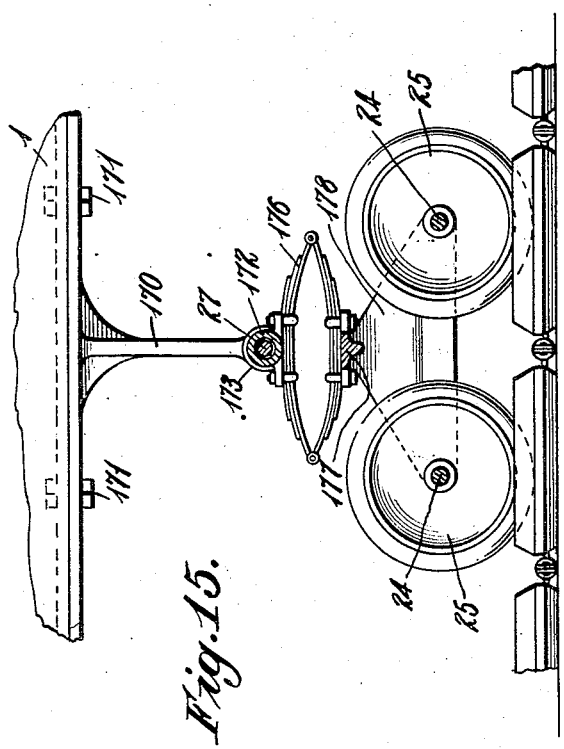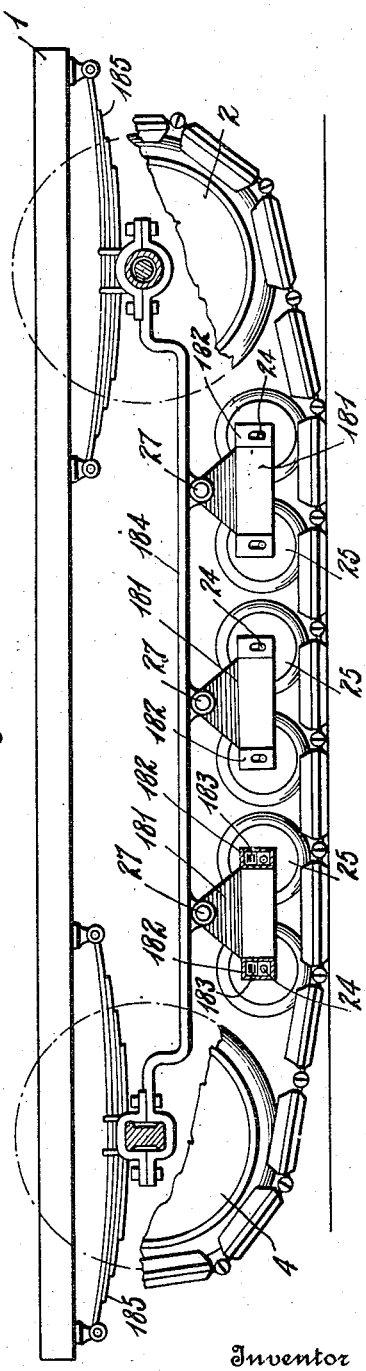

Patented Jan. 30, 1923.

1,443,871

UNITED STATES PATENT OFFICE.

LEWIS K. DAVIS, OF WASHINGTON, DISTRICT OF COLUMBIA.

ENDLESS-TRACK VEHICLE.

Application filed May 10, 1922. Serial No. 559,857.

*To all whom it may concern:*

Be it known that I, LEWIS K. DAVIS, a citizen of the United States, residing at Washington, in the District of Columbia, have invented certain new and useful Improvements in Endless-Track Vehicles, of which the following is a specification.

My invention relates to track-laying vehicles, and particularly to the steering mechanism of such vehicles.

An object of my invention is to permit the flexible tracks upon which the vehicle runs to be warped at the same time that the brake is applied to one of them, so that the turning of the vehicle can be easily and quickly effected.

Another object of my invention is to provide a vehicle that can run on wheels or on a self-laid track, and in which steering is accomplished by means of guide wheels that are designed to turn less quickly when the vehicle is running on tracks than when running on wheels.

A still further object of my invention is to provide a mechanism for moving the guide wheels of a vehicle adapted to run either on wheels or on a self-laid track, wherein the angle of turning of the guide wheels may be greater when the vehicle is running on wheels.

A further object of the invention is to so support the vehicle on the tracks that when the tracks are warped or bent laterally during the steering operation the supports may be moved laterally with the tracks, provision being also made for returning the supports to normal position when the steering mechanism is operated to guide the vehicle straight ahead.

Heretofore, in order to turn track-laying vehicles, it has been necessary to brake one of the tracks to either partially or totally stop that track. The braked track will act as a pivot, and the moving track to which the power is being applied will cause the vehicle to turn about the braked track as a pivot. Such turning has notable disadvantages.

First, the braked track digs deeply into the soil of the road, thereby harming its surface. Second, the track that is braked is quickly worn out by reason of the tremendous grinding action to which it is subjected in turning. This grinding causes the metal of the tracks to become crystallized and brittle and where rubber or fiber tracks are used the surface quickly wears out. Third, the track is often thrown off of the supporting wheels while it is braked, since the turning action tends to wrench the track free therefrom. Thus time is lost in repair and the utility of track-laying vehicles is greatly diminished. These are some of the disadvantages of the present system of steering track-laying vehicles.

My invention comprises a vehicle which is adapted to run on self-laying tracks, or upon wheels on the road. There are two sets of steering mechanisms, one of which is adapted to be used when the vehicle is running on wheels, the other when running on the tracks. The steering mechanism used when the vehicle runs on wheels gives a quick motion to the guide or steering wheels and these wheels may be turned through a wide angle such as is customary in automobiles. The steering of the vehicle, when running on the tracks, is effected by means of warping the tracks or bending them laterally and at the same time applying the brake to one of them. The warping of the tracks is in a direction to aid in the turning of the vehicle. For purpose of warping the tracks, the guide wheels are caused to turn, which throws the tracks out of a straight line. In this latter case, the speed with which they turn is less than when the vehicle runs on wheels, and, moreover, the angle through which the steering wheels may turn is also less. The bogies for supporting the load-bearing wheels are so mounted that they may slide laterally, so that when the tracks are warped the bogies may be carried with the track. I employ a type of flexible track permitting lateral flexing which I have found to be particularly adapted for use in this type of vehicle.

With these and other objects in view which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a top plan view showing the application of my mechanism to a track-laying vehicle;

Fig. 2 is a view in side elevation of the structure shown in Fig. 1;

Fig. 3 is a diagrammatic illustration showing the angle of deflection of the steering wheels where the vehicle is running on wheels;

Fig. 4 is a diagrammatic illustration showing the angle of deflection of the steering wheels where the vehicle is running on self-laid tracks;

Fig. 5 is a longitudinal section through the center of the steering gear housing;

Fig. 6 is a detail view of the steering gear housing, the steering rod and links;

Fig. 7 is a cross-sectional view on line 7—7 of Fig. 5;

Fig. 8 is a detail view partly in section of the steering and braking mechanism, showing the clutching mechanism which cooperates therewith;

Fig. 9 is a detail view partly in section of the brake rod gear and housing;

Fig. 10 is a detail view of a form of bogy and support which I may employ in my mechanism;

Fig. 11 is another detail view partly in section, of the form of bogy shown in Fig. 10;

Fig. 12 is a top plan view of one type of track which I employ;

Fig. 13 is a view in longitudinal section on the line 13—13 of Fig. 12;

Fig. 14 is an end view of the track shown in Fig. 12;

Fig. 15 is a detail view of another form of bogy;

Fig. 16 is a view partly in section of the structure shown in Fig. 15, illustrating the mounting of the bogy on cross-bars;

Fig. 17 is a view partly in section showing the application of still another type of bogy;

Referring to the drawings, Figs. 1 to 4 inclusive, I have shown a track-laying vehicle having a frame 1, and drive-wheels 2, which are connected through a differential 3 to a suitable source of power (not shown) carried on the vehicle. For the purpose of steering the vehicle I have shown guide wheels 4 on stub axles pivoted on pivots 5 on a front axle 6. Connected to the guide wheels 4 are levers 7 which are pivoted at 8 to a connecting rod 9. To one of the levers 7 is connected a lever 11, preferably formed integrally therewith, and constituting with said lever 7 a bell-crank lever. To the free end of the lever 11 is pivoted at 12, a steering rod 13, which is adapted to be pushed in a forward or pulled in a backward direction, as later described, to turn the guide wheels 4.

Adapted to fit over the drive wheels 2 and the guide wheels 4 are fibre or rubber tracks 14 having their ends bolted together at 15 to enable the tracks to be readily applied to or demounted from the vehicle. To hold the tracks taut and at the same time to allow them to give to a heavy jolt, I have provided lever arms 16, pivoted at points 17 on supports 18, attached to the vehicle frame 1. At one end of the lever arms 16 are mounted rollers 19 which bear against the tracks 14 and exert pressure thereon by reason of springs 21 attached to the other ends of the levers 16 and to the frame 1 of the vehicle body.

Under normal conditions, in using my vehicle with the flexible tracks mounted thereon, neither the drive wheels 2 or the guide wheels 4 carry the weight of the vehicle. To carry the weight of the vehicle are provided bogies 22, (see Figs. 1, 2, 10 and 11) formed with two downwardly depending flanges 23 in which, at their lower edges, are journalled shafts 24, carrying wheels 25 which run upon the interior of the flexible tracks 14. At their upper end the plates 23 of each bogy 22 are formed with a sleeve 26 through which passes a crossbar 27. The sleeves 26 are provided at their ends with caps 28 which are screwthreaded thereon and form with the sleeves 26, ball-races for balls 29. These ball-bearing supports permit the bogies 22 to easily swing on the crossbars 27 as pivots, or to slide laterally thereon.

To hold the bogies 22 in proper position, I have provided the crossbars 27 with annular shoulder members or collars 31 which are adapted to be held in tight and non-slipping engagement with the crossbars 27 by means of tightening screws 32. The annular shoulder members 31 are placed on either side of the sleeves 26 of the bogies 22, and between the caps 28 and the shoulder members 31 I have mounted compression springs 33 which allow the bogies to slide laterally on the crossbars 27, but tend always to return them to their normal position.

Clamped to the crossbars 27 are clamping members 34 each comprising a lower half 35 and an upper half 36, which are held together by bolts 37. The upper half 36 of each clamping member 34 is preferably integrally formed with a plunger 38 having a shoulder 39 at its lower extremity. The plunger 38 fits within an annular housing 40 carried on a support 41 that is bolted by means of bolts 42 to the frame 1 of the vehicle. Each housing 40 is provided on either side with a slot 43 in which is adapted to slide a plug 44 which passes through the plunger 38. Compressed between the support 41 at its top, and the shoulder 39 on the plunger 38 at its bottom, is a compression spring 45. The compression spring 45 transmits the load of the vehicle from the frame to the crossbar 27.

Each crossbar supports a clamp and plunger on either side of the vehicle, which clamps and plungers fit into housings on the supports 41 and transmit the load of the vehicle through the springs 45 to the crossbars 27 and from thence to the bogies 22 and through the wheels 25 mounted in the bogies, to the tracks 14. When the vehicle is traveling on the tracks 14, the bogies are in place, as shown in Figs. 1 and 2. When, however, the operator desires to drive the vehicle on the road with the tracks demounted, the screws 32 of the annular shoulder members 31 at the outer ends of the crossbars 27 are unscrewed and removed, whereby the entire bogy constructions may be removed.

To steer the vehicle the guide wheels are turned through an angle. The guide wheels are adapted to be flexed through a larger angle when the tracks are removed and the vehicle is running on the road than when the tracks are mounted on the vehicle. This condition is diagrammatically illustrated in Figs. 3 and 4, in which Fig. 3 shows the turning of the guide wheels when the track is removed, and Fig. 4 shows the turning of the guide wheels when the track is on the vehicle. The degrees of turning shown are merely illustrative and the angles given have no significance. When the track is on the vehicle the turning of the guide wheels warps the track or bends it laterally which aids in turning the vehicle, as will be later described.

To steer the vehicle, I have shown a steering wheel 46 formed with spider arms 47, which at their point of juncture are formed with a hexagonal aperture 48 (see Figs. 5 and 7). I have shown two steering columns 49 and 51. The steering column 49 is adapted to rotate within the steering column 51 and extends beyond the upper extremity of the steering column 51. The steering column 49 is provided with a key-way 52, and surrounding the portion of the steering column 49 having the key-way therein, is a hexagonal shoulder 53, having a key-way 54 therein. The key 55 is adapted to fit in the key-way 52 of the steering column 49, and the key-way 54 of the hexagonal shoulder 53. The key 55 tightly and immovably holds the hexagonal shoulder 53 to the steering column 49.

Adapted to pass through the juncture of the spider arms 47 are screws 56 which screw into apertures 57 of the hexagonal collar 53. As shown in Figs. 5 and 7, the screws 56, when tightly screwed into the apertures 57 of the hexagonal shoulder 53 hold the steering wheel 46 in tight engagement with the steering column 49, and the steering column 49 may be rotated to steer the vehicle.

By loosening the screws 56, the steering column 46 may be slipped down over a hexagonal portion 58 of the steering column 51, and the screws 56 again screwed into apertures 59 in such hexagonal portion, whereupon the steering wheel 46 may be made to turn the steering column 51 without turning the steering column 49.

Adapted to extend from one side to the other of the frame 1, is a support 61 which is firmly bolted at either end to the support 1 on either side of the vehicle. Bolted by means of bolt 62 to the lower side of the support 61, is a gear casing support arm 63 formed integrally with a gear casing 64. The steering columns 49 and 51 pass through a gear casing top 65 which is screw-threaded into the gear casing. Within the gear casing, mounted on the steering column 51, is a worm 66, and upon the steering column 49 on the portion of the column that extends through the worm 66, is a worm 67.

The lower end of the steering column 49 is journalled in a bearing 68 formed in the bottom of the gear casing 64, and the lower end of the column 49 is reduced at 69, forming a shoulder 70 that prevents the steering column 49 from sliding in a downward direction. A retaining nut 71 prevents the steering column 49 from sliding in an upward direction. Journalled in the gear casing 64 is a shaft 72 to which is keyed by means of a key 73, a worm sector 74 that meshes with the worm 66. Journalled in the lower part of the gear casing 64 is a shaft 75 which is keyed by means of a key 76 to a worm sector 78 that meshes with the worm 67. The worm 66 is of a greater pitch than the worm 67 and, therefore, for a corresponding degree of turn of the respectively steering columns attached to these worms, there would be a larger angular movement of the shaft 72 than there would be of the shaft 75. Fastened to the gear casing 64 by means of screws 79 is a side plate 81. The worm sector 74 is so formed that it may have a greater angular movement before it encounters and is arrested by the side plate 81, than is the case with the worm sector 78, which latter is larger in size and is, therefore, more limited in movement.

In order to permit either one of the two shafts 72 or 75 to operate the steering mechanism, I have mounted on the shaft 72 a clutch member 82 which is free to rotate on the shaft 72 and is prevented from slipping from off the end thereof by means of a lock nut 83. Integrally formed with the clutch member 82 is a link 84 that is pivoted at its end 85 in a slot 86 formed in the enlarged end 87 of the steering rod 13. The link 84 is formed with a slot 88 in which is adapted to slide a lug 89 carried on a link 91. The link 91 is integrally formed with a clutch member 92 which is adapted to freely rotate on the shaft 75 and is held from slipping off the end thereof by means of a lock nut 93.

Pivoted at 94, on a support piece 95, attached to the gear casing 64, is a clutch arm 96 carrying upper lugs 97 and lower lugs 98. The upper lugs 97 fit within a groove 99 formed in a clutch member 101 that is keyed to rotate with shaft 72 but adapted to slide thereon so that when the clutch lever 96 is moved in a counter clock-wise direction, the clutch member 101 engages with the clutch member 82. When the clutch lever is thrown in a position to engage the clutch member 82 with the clutch member 101, the lugs 98 engage a groove 100 in a clutch member 102 that is keyed to rotate with shaft 75 and adapted to slide thereon, to throw clutch member 102 out of engagement with the clutch member 92. By means of moving the clutch lever 96 in either one direction or the other, either of the gear sectors 74 or 78 may be thrown into engagement with the steering mechanism to operate the same.

The clutch lever 96 will be moved in either one direction or the other, depending upon which of the steering columns is used. If the vehicle is running on tracks and the steering column 49 is being utilized, the clutch lever will be thrown, as indicated in Fig. 8, whereby clutch members 92 and 102 are brought into engagement, and clutch members 82 and 101 are thrown out of engagement. This will insure that the guide wheels will turn more slowly and through a more limited angle than is the case where the clutch lever is thrown to cause clutch member 82 and clutch member 101 to engage.

One end of the shaft 75 is journalled in a gear casing 103, preferably formed with a support arm 104, that is firmly bolted by means of a bolt 105 to the support 61. The gear casing 103 is formed with a bearing 106 through which the end of the shaft 75 projects, permitting free rotation of the shaft. Keyed to the shaft 75 and mounted within the casing 103 is a sector of a beveled gear 107 which meshes with another sector of a beveled gear 108, which latter is mounted on a bolt 109 that extends through the casing 103 and is held in position by means of a nut 111. The gear 108 is preferably formed integrally with a brake-lever 112, which extends through a slot 113 in the casing, whereby the break-lever 112 has free lateral movement. A casing cover 114 forms a complete housing for the gears and is bolted by means of bolts 115 to the casing. The casing cover 114 is formed with a bearing 116 therein in which the shaft 75 is adapted to rotate. There is formed in the casing cover a slot 117 through which the brake-lever 112 may have free lateral movement.

Lateral movement of the brake-lever 112 is adapted to operate a mechanism to apply brakes to either one of the two drive wheels. The drive wheel lying on the inside of the arc of turning is braked in making a turn. The braking of the drive wheel aids the warping of the track in turning the vehicle and takes place at the same time, as will be later explained. Attached to the ends of the brake-lever 112 and pivotally connected thereto, are brake rods 118 formed with bifurcated ends 119 through which are adapted to pass bolts 121 held in place by means of nuts 122.

The movement of the brake-lever 112 is transmitted to the brake-rods 118, to levers 123, to hollow shafts 124 rotatably mounted on the vehicle, from whence motion is transmitted to levers 125 and from thence through rods 126 to the braking mechanism.

The braking mechanism is so adjusted that upon movement of the brake-lever 112 in either direction the brake on one side only of the vehicle will be applied. This braking takes place on the side of the vehicle in which the brake-rod 118 is moved in a forward direction.

Should it be necessary to apply the brake to both rear wheels at once, as when stopping the vehicle, I have provided a mechanism which comprises a foot-brake pedal 127 pivoted on a support 128, to which is pivotally attached a brake-rod 129. The brake-rod 129 transmits motion to a lever 131 and from thence to a shaft 132 journalled within the hollow shaft 124. Rotation of the shaft 132 moves levers 133 to pull forward rods 134 and apply the brakes to both drive wheels at the same time.

It is obvious that rods 134 and 126 must lead to two different brake bands, since they are operated independently. This has not been illustrated in detail since the specific character of the brake bands or other mechanism operated by the rods 134 and 126 is no part of this invention.

In operation, let us assume the operator desires to drive the vehicle on the road without the use of the self-laying track. The bolts 15 in the tracks 14 are removed and the tracks taken off of the vehicle. Bogies 22 are dismounted by means of undoing screws 32 and removing shoulders 31 on the crossbars 27. The steering wheel 46 is attached to the steering column 51 and the clutch handle 96 is moved so that the clutch member 101 engages member 82, and then motion of steering wheel 46 will be transmitted through the steering column 51, the worm 66, worm sector 74, and through the shaft 72 and link 84 to the steering rod 13. The speed with which the guide wheels may be turned is similar to that of other wheel-supported automotive vehicles of the same class, and the maximum angular movement of the guide wheels likewise corresponds to the usual practice.

There can be no braking of either of the drive wheels separately, but should it become necessary to apply the brake, this may be done through the foot-lever 127.

Where the country is rough or the roads muddy, and the driver desires to use the vehicle as a track-laying vehicle, the bogies 22 are put in place and the tracks 14 mounted on the vehicle, as illustrated in Fig. 2. The clutch handle 96 is positioned, as illustrated in Fig. 8, wherein clutch member 82 and clutch member 101 are not in engagement, but clutch member 92 and clutch member 102 are locked. The steering wheel is placed on steering column 49 and the movement of the steering wheel will operate worm 67 and move worm sector 78 to rotate shaft 75. As before mentioned, the speed with which shaft 75 may be rotated is less than is the case with the shaft 72, and likewise the degree of rotation is more limited, see Figs. 3 and 4.

A rotation of the steering wheel 46 will cause link 91 to transmit motion to the steering rod 13. The rotation of the shaft 75 likewise, through gears 107 and 108, moves the brake-lever 112. The movement of the guide wheels 4, effected by the movement of the steering rod 13, causes the track 14 to warp, tending to turn the vehicle in the direction of the warping. The flexible mounting of the bogies 22 on the crossbars 27 permits the track to flex, but the springs 33 tend to return the track to normal position after the guide wheels have assumed the straight ahead position. At the same time that the flexing of the track takes place, the brake-lever 112 is moved to apply the brake to the drive wheel on the inside of the turn. The combination of the warping of the tracks with the expedient of braking causes the vehicle to turn quickly without tearing the road surface or injuring the track itself.

Other forms of apparatus may be used for the mounting of the supporting bogies on my vehicle.

Should the use of a flexible fiber or rubber track be inadvisable by reason of the character of the country to be crossed and of the type of roads encountered, I may utilize (see Figs. 12, 13 and 14) a track structure comprising metallic track plates 150, having at their bottom, spacer strips 151. The spacer strips slightly raise the track structure above the ground and permit of the free play of a universal joint connecting structure 152, comprising a ball 153 and a socket 154 formed by means of joining two shoulders 155 and 156, by means of rivets or bolts 157. The ball 153 is fastened to a strip 158 which is suitably riveted to the under side of one plate, and the socket structure is carried on a strip 159 which is suitably riveted to the bottom of the adjacent track-plate. Running the length of the track-plates are ridges 161, forming a trackway in which the wheels of the bogies and the drive and guide wheels run.

I may use other forms of mounting for the bogies if I so desire, and I have shown a construction in Figs. 15 and 16 which comprises supports 170 bolted to the frame 1 of the vehicle by means of bolts 171. The crossbars 27 have mounted thereon sleeves 172 which, with caps 173, form race-ways for balls 174, permitting the collars to either slide or to rotate freely on the crossbars 27. The sleeves 172 are prevented from sliding off of the crossbars 27 by means of shoulders 175 which are detachably fastened to the crossbars 27. Bolted to the collar 172 are leaf-springs 176 each of which at the bottoms is bolted to a bogy 177 comprising side plates 178 in which is journaled the axle 24 of a wheel 25. This construction permits the shock and jar to be absorbed before it is transmitted to the crossbars 27, and moreover, permits the bogies to readily accommodate themselves to the various positions of the track when encountering obstacles or when the track is warped in steering the vehicle.

In Fig. 17 I have shown a structure in which I have mounted bogies 181 on the crossbars 27 in the manner indicated in Figs. 10 and 11. The bogies in the construction illustrated in Fig. 17 are formed with spring compartments 182 in which are placed compression springs 183 that absorb the shock transmitted from the axles 24 of the wheels 25. The crossbars 27 are carried on longitudinal supports 184, there being a support on each side of the vehicle. These longitudinal supports are attached at their ends to leaf-springs 185 that support the frame 1 of the vehicle.

I have devised a construction by which steering of a track-laying vehicle is accomplished by means of warping the track to effect the turn. This construction I have shown in combination with a construction which automatically brakes one of the tracks to aid in turning the vehicle when the track is warped. The construction of track and of bogy supports for use with my mechanism insure proper operation of the device under all conditions of use.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

The motor driven vehicle shown in the drawings and hereinbefore described has an extended traction surface, i. e. the track belts may be of considerable length, the driving wheels and the guide or steering wheels being raised above the ground while the weight of the vehicle is sustained entirely by supports which rest on the lower runs of the belts between the driving and guiding wheels. These supports are so mounted that they are moved laterally with the belts when the latter are bent laterally for steering purposes and they also swing about horizontal axes while being moved laterally. Preferably these supports are in the form of bogies, each carrying a pair of wheels and springs are interposed at suitable places in the supports or between the supports and the vehicle frame or body to absorb the shocks.

I claim:

1. A track-laying vehicle comprising a pair of flexible tracks upon which the vehicle travels, means on the vehicle to simultaneously warp the tracks in the same direction, and means to brake one of the tracks to cause the vehicle to turn.

2. A track-laying vehicle comprising a pair of flexible tracks upon which the vehicle travels, a steering mechanism whereby the tracks may be warped, and means attached to the steering mechanism whereby one of the tracks may be braked simultaneously with the warping of the tracks.

3. A track-laying vehicle comprising a pair of flexible tracks upon which the vehicle travels, a steering column, means connected with the steering column to warp the tracks and means connected with the first mentioned means whereby one of the tracks may be braked simultaneously with the warping of the tracks.

4. A track-laying vehicle comprising a pair of flexible tracks upon which the vehicle travels, a steering column, a shaft, means operated by the steering column to rotate the shaft, brake rods, means connecting the brake rods to the shaft whereby only one of the tracks will be braked at one time, and warping mechanism for the tracks connected to said shaft.

5. A track-laying vehicle comprising a pair of flexible tracks upon which the vehicle travels, a steering column, a shaft, gearing operated by the steering column to rotate the shaft, a steering rod, a link adapted to reciprocate the steering rod when the shaft is rotated, guide wheels running in said tracks, means for turning the wheels connected to said steering rod, brake rods, and means connecting the brake rods to the shaft whereby only one of the tracks will be braked at one time.

6. A track-laying vehicle comprising a pair of flexible tracks upon which the vehicle travels, means for propelling the tracks, guide wheels traveling in the tracks, a steering column, a shaft, gearing operated by the steering column to rotate the shaft, a steering rod, a link connected to the shaft and adapted to reciprocate the steering rod when the shaft is rotated, means for turning the guide wheels connected to the steering rod, a gear on the shaft, a brake-lever, a gear on the brake-lever meshing with the gear on the shaft, brake rods connected to the brake-lever whereby when the steering wheels are turned the tracks are warped and one of the tracks is braked.

7. In a motor driven vehicle a frame, endless tractor belts, driving wheels supported by the frame and engaging the belts, guide or steering wheels supported by the frame and also engaging the belts and frame supporting members bearing on the lower runs of the belts between the driving and guide wheels which are mounted to move laterally with the belts whenever the latter are bent laterally for steering purposes.

8. In a motor driven vehicle a frame, endless tractor belts, driving wheels supported by the frame and engaging the belts, guide or steering wheels supported by the frame and also engaging the belts, a plurality of frame supporting members bearing on the lower run of each belt between the driving and guide wheels, and which are independently mounted to move laterally to different extents with the associated belt whenever the latter is bent laterally for steering purposes.

9. In a motor driven vehicle a frame, endless tractor belts, a pair of driving wheels cooperating therewith, a pair of guide or steering wheels engaging the belts, frame supporting members on opposite sides of the vehicle bearing on the lower runs of the belts between the driving and guide wheels and which are mounted to move laterally with the belts whenever the latter are bent laterally for steering purposes and springs associated with the supporting members for returning them to normal position when the track belts are straightened.

10. In a motor driven vehicle a frame, endless tractor belts, driving wheels associated therewith, guide or steering wheels also associated with the belts, frame supporting members bearing on the lower runs of the belts between the driving and guide wheels and which are pivotally mounted to swing fore and aft about horizontal axes and which are movable laterally with the belts whenever the latter are bent laterally for steering purposes.

11. In a motor driven vehicle a frame, endless tractor belts, driving wheels associated therewith, guiding or steering wheels also associated with the belts, frame supporting members consisting of wheeled bogies on opposite sides of the vehicle bearing on the lower runs of the belts between the driving and guiding wheels and which are mounted to move laterally with the belts whenever the latter are bent laterally for steering purposes.

12. In a motor driven vehicle, a frame, endless tractor belts, driving wheels associated therewith, guide or steering wheels also associated with the belts, frame supporting members consisting of wheeled bogies on opposite sides of the vehicle bearing on the lower runs of the belts between the driving and guide wheels and which are mounted to move laterally with the belts whenever the latter are bent for steering purposes and springs for returning the bogies to normal position.

13. A track laying vehicle comprising a frame, endless flexible tracks carried thereby, frame supporting members bearing on the lower run of each track and each mounted to move independently of the others laterally in unison with a corresponding lateral movement of the portion of the track which it engages.

14. A track laying vehicle comprising a frame, a pair of endless flexible tracks, wheels over which the tracks pass and which are raised above the horizontal lower runs of the tracks, means for shifting the front or steering wheels to steer the vehicle by warping or bending the tracks laterally, frame supporting members bearing on the lower runs of the tracks and which are mounted to move laterally with the tracks whenever the latter are bent laterally for steering purposes.

15. A track laying vehicle comprising a frame, a pair of endless flexible tracks, wheels over which the tracks pass and which are raised above the horizontal lower runs of the tracks, means for shifting the front or steering wheels to steer the vehicle by warping or bending the tracks laterally, a plurality of independently movable frame supporting members bearing on the lower run of each track and which are mounted to move laterally with the track whenever the latter is bent laterally for steering purposes.

16. A track laying vehicle comprising a frame, a pair of endless flexible tracks, wheels over which the tracks pass and which are raised above the horizontal lower runs of the tracks, means for shifting the front or steering wheels to steer the vehicle by warping or bending the tracks laterally, a plurality of independently movable frame supporting members bearing on the lower run of each track which are mounted to swing fore and aft of the vehicle and which are moved laterally with the tracks whenever the latter are bent laterally for steering purposes.

17. A track laying vehicle comprising a pair of flexible demountable tracks, guide wheels on the vehicle adapted to run in the tracks, means whereby the guide wheels may be turned to a limited angle to steer the vehicle by warping or bending the tracks laterally or through a greater angle when the tracks are moved to steer the vehicle by the engagement of the wheels with the road, and frame supporting members bearing on the lower runs of the belts between the driving and guiding wheels and which are moved laterally with the belts when the latter are bent laterally for steering purposes.

In testimony whereof I affix my signature.

LEWIS K. DAVIS.